United States Patent
Wang et al.

(10) Patent No.: US 11,367,171 B2
(45) Date of Patent: Jun. 21, 2022

(54) METHOD FOR DETECTING HOLLOWING OF EXTERIOR WALL FINISH LAYER

(71) Applicant: DALIAN UNIVERSITY OF TECHNOLOGY, Dalian (CN)

(72) Inventors: Zongshan Wang, Dalian (CN); Zhiqiang Zhai, Dalian (CN); Lin Duanmu, Dalian (CN); Zhengjian Shao, Dalian (CN); Siyang Yue, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 312 days.

(21) Appl. No.: 16/619,394

(22) PCT Filed: Mar. 13, 2018

(86) PCT No.: PCT/CN2018/078780
§ 371 (c)(1),
(2) Date: Dec. 4, 2019

(87) PCT Pub. No.: WO2019/173958
PCT Pub. Date: Sep. 19, 2019

(65) Prior Publication Data
US 2020/0184630 A1    Jun. 11, 2020

(51) Int. Cl.
| | | |
|---|---|---|
| *G06T 7/00* | (2017.01) | |
| *G01N 21/88* | (2006.01) | |
| *G01N 25/18* | (2006.01) | |
| *G01N 25/72* | (2006.01) | |
| *H04N 5/33* | (2006.01) | |

(52) U.S. Cl.
CPC ....... *G06T 7/0004* (2013.01); *G01N 21/8851* (2013.01); *G01N 25/18* (2013.01); *G01N 25/72* (2013.01); *H04N 5/33* (2013.01); *G06T 2207/10048* (2013.01)

(58) Field of Classification Search
CPC ........ G06T 7/0004; G06T 2207/10048; G01N 21/8851; G01N 25/72; G01N 25/18; H04N 5/33
USPC .......................................................... 382/108
See application file for complete search history.

(56) References Cited

FOREIGN PATENT DOCUMENTS

| | | |
|---|---|---|
| CA | 2 267 586 A1 | 10/1999 |
| CN | 106018420 A | 10/2016 |
| JP | S60-213854 A | 10/1985 |
| JP | S64-078139 A | 3/1989 |
| JP | 2849245 B2 | 1/1999 |
| WO | WO 2012/062564 A1 | 5/2012 |
| WO | WO 2014/146222 A1 | 9/2014 |

OTHER PUBLICATIONS

Tian, Xuyuan et al., "Application on Detection of the Wall Hollow Using Infrared Image Processing Technology"; Computer Measurement & Control, vol. 20, Issue No. 6, Jun. 25, 2012, pp. 1501-1503.

*Primary Examiner* — Michael R Neff
(74) *Attorney, Agent, or Firm* — Muncy, Geissler, Olds & Lowe, P.C.

(57) ABSTRACT

The present invention belongs to the technical field of constructional engineering safety detection, and provides a method for detecting hollowing of an exterior wall finish layer. The method for detecting a defect of a facade finish layer of a building proposed by the present invention can realize remote detection in the on-site detection operation and avoid high-altitude hazardous operation of personnel, and is simple and convenient in operation. In data analysis and processing, the method not only can overcome the subjectivity and the instability caused by manual color identification of a temperature image, but also can realize batch processing of image analysis through software or conduct real-time detection and analysis.

2 Claims, No Drawings

METHOD FOR DETECTING HOLLOWING OF EXTERIOR WALL FINISH LAYER

TECHNICAL FIELD

The present invention belongs to the technical field of constructional engineering safety detection, is a technical means of wall quality detection, and relates to an on-site detection method for detecting whether a potential safety hazard of hollowing exists in a facade finish layer of a building, such as a tile.

BACKGROUND

Pasting of an exterior wall finish brick is a common decorative form of an exterior wall in current urban buildings, and is widely used for its advantages of aesthetics and economy, however, it may form a hollowing leading to the out layer fall off and cause a potential safety hazard. The main problem is that the bonding strength between a finish layer and a concrete or brick base layer will be gradually decreased over time because the construction quality fails to reach the standard or the construction is aged. When a bonding force fails to meet the requirements, the finish layer may be partially separated from the base layer at first to form the hollowing. In case of no reinforcement, the area of the hollowing will be gradually increased, and finally the finish layer is completely separated from the base layer and falls down from a high places, and accidents may happens. Due to large detection area, fine detection defect requirements and limitation of high altitude work on a facade, a detection means for rapid diagnosis and defect inspection of the facade finish layer of the building is needed.

At present, the detection of the defects of the exterior wall finish of the building mainly includes a tapping method, a pull-off method and an infrared thermal imaging method. Because the tapping method and the pull-off method are accurate in detection results, for the high-altitude operation required for the facade of the high-rise building, the time required for the detection is long, the efficiency is low, and the subjective judgment of the detectors has a great influence. Compared with other methods, the infrared imaging method has obvious advantages in the application of inspection of hollowing of the exterior wall finish brick because of its characteristics of high efficiency, intuitiveness, quickness, and low cost of labor and materials. According to this, some relevant detection regulations and standards is issued. However, the existing infrared method is limited in the actual detection application process with the following main problems:

1. When the infrared method is used to detect the hollowing of the exterior wall finish brick, If the detection result determined by simply relying on the color difference of the shot infrared image, It is very susceptible to meteorological conditions, especially solar radiation, thereby restricting the detection conditions is needed.

The temperature difference between the hollowing region and a normal region of the exterior wall surface is continuously changing with the time under the irradiation of strong solar radiation intensity. In the "Technical Regulation for Detecting Bonding Quality of Building Exterior Wall Finish by Infrared Thermal Imaging Method" (JGJ/T277-2012). The detection time periods are specified suitable for part of cities in China, but there is no universal general criteria. The Chinese patent with application No. of 201610523425.X (an infrared quality detection method for exterior wall hollowing defect) proposes a method for cooling an entire wall surface irradiated with sunshine and then sprayed with a coolant to reduce detection errors. Although this method is feasible, the surface of the exterior wall needs to be cooled for 5-15 minutes, and sprayed evenly. The operation is relatively difficult and the cost is high in the actual execution process.

When the meteorological conditions are poor (such as cloudy weather, and heavy fog), the temperature difference of the wall surface will be very small, and especially the detection effect of the north facade using infrared thermal imager will be greatly reduced. The Chinese patent with application No. of 200810207217.4 discloses a non-contact non-destructive detection method for inspecting the hollowing position of an ancient mural. The surface of the exterior wall is heated by a bulb, and a thermogram is obtained by infrared thermal imaging, thereby judging that a region where the heat rise is not obvious is a hollowing region. Although this method can be used to detect the hollowing of the exterior wall to improve the detection efficiency of the hollowing of the exterior wall, when the bulb is reheated, detection conditions such as power supply and distribution are required, which is complicated. Moreover, the surface of the exterior wall has very small temperature rise, and is heated unevenly, and the effect is not obvious.

2. The current technical means are to judge the defect position by using the color difference in the detected infrared image caused by the temperature difference. The common problem that always exists is that the color difference is greatly affected by factors of a color temperature value range selected in the post-image processing process, and needs manual adjustment; and for the entire inspection of the building exterior wall, labor cost and time consumption are greatly increased, and the efficiency is low. An analysis method capable of conducting batch processing and calculation by using the computer can overcome the subjectivity in the identification process and improve the reliability of detection and identification.

3. When the infrared method is used to detect the hollowing of the exterior wall finish brick, surrounding environment radiation, the emissivity of the outer surface of the wall surface, the surface color and the shooting angle will have a great influence on the detection results. A temperature abnormal region not caused by the hollowing may appear on an infrared picture, and thus a high incorrect judgment rate exists due to simple reliance on the contrast between an infrared thermogram and a visible light image. For this reason, the bonding defect of the finish layer cannot be fully determined, and other auxiliary detection methods such as a hammering method and the pull-off method are also needed to conduct necessary verification.

SUMMARY

The purposes of the present invention are:

(1) A method for finding a suspicious position with defects using an infrared temperature gradient image.

Although the temperature test accuracy of an infrared camera is not high, a temperature resolution can reach 50 mK or higher. The present invention proposes to convert an original infrared temperature image into a temperature gradient image by data processing; the temperature at a boundary between a normal region and an abnormal region is obviously stepped; the temperature gradient in this position will be significantly higher than the gradient within the region; the gradient image is filtered and compared with the contour line of visible light through the combination of two means to filter out a texture contour; and the position and the contour of a region which may have a defect can be identified through further processing.

(2) Detection of defects by amplifying surface temperature difference through an auxiliary technical means of heating the surface by laser irradiation in case of poor detection conditions, and especially the north facade or low solar irradiation intensity. The auxiliary means realizes non-contact detection by using the long-distance transmission characteristic of a laser beam, has rapid heating, uniform heating amount and controllable and accurate adjustment, and identifies and judges the hollowing by using a relationship between the irradiated temperature rise and the radiation amount.

(3) A method for identifying and judging whether a hollowing defect of a finish layer exists through the contrast of the temperature difference change in heating and cooling processes for a suspicious region having abnormal temperature.

Because the region having finish layer hollowing forms a "hot spot" during heating due to rapid heating of a hollowing surface and forms a "cold spot" during cooling due to rapid cooling, the change feature of positive and negative reversal occurs by using a temperature difference between a hollowing defect position and a normal surface, thereby precluding the influence of other factors such as surface emissivity and wall material and then confirming whether the hollowing exists. The technical means improves the identification accuracy and reliability of a traditional infrared detection method, avoids the danger of high-altitude operation caused by contact detection compared with the tapping method and the pull-off method, and has high detection efficiency.

The technical solution of the present invention is:

A method for detecting hollowing of an exterior wall finish layer comprises the following steps:

(1) when an exterior wall to be detected is in good solar radiation conditions, conducting the infrared temperature image test of a building facade in a surface heating stage, obtaining an original visible light image and an infrared image, and recording the number of each image, corresponding shooting position information and solar radiation intensity information;

shaping and calibrating the original visible light image and the infrared image with reference to identification points of the visible light image, according to shooting angles to form a planar image as was shot in front;

(2) converting the infrared image obtained in the previous step into a temperature gradient image; adjusting and filtering the image according to the test condition; removing a surface texture effect of the temperature gradient image to obtain a contour map of a surface temperature abnormal region; then comparing with the contour of the original visible light image to identify an original block contour line of a facade from the infrared image; and expressing the remaining other contour line closed regions as defective suspicious blocks;

(3) screening an image having the defective suspicious block; identifying suspicious contour lines corresponding to the obtained defective suspicious block on the infrared image and the original visible light image; and respectively calculating the area and average temperature of the defective suspicious block and surrounding blocks;

(4) after positioning a defective suspicious part of a building according to the recorded numbers of the images, the shooting position information and the defective suspicious region identified on the original visible light image, examining the defective suspicious part again in a cooling time period, and repeating the operation of the above steps (1)-(3);

summarizing each defective suspicious part and the surrounding region; measuring the detected average temperature repeatedly; calculating a temperature difference; and if a significant positive-negative alternating temperature difference is found, judging that the defective suspicious part has a hollowing defect.

The present invention has the beneficial effects: the method for detecting a defect of a facade finish layer of a building proposed by the present invention can realize remote detection in the actual detection operation and avoid high-altitude hazardous operation of personnel, and is simple and convenient in operation. In data analysis and processing, the method not only can overcome the subjectivity and the instability caused by manual color identification of a temperature image, but also can realize batch processing of image analysis through software, furthermore it will contribute to conduct real-time detection and analysis.

DETAILED DESCRIPTION

Specific embodiment of the present invention is further described below in combination with the technical solution.

Embodiment

A method for detecting hollowing of an exterior wall finish layer comprises the following steps:

(1) when an exterior wall to be detected is in good solar radiation conditions, conducting the infrared temperature image test of a building facade in a surface heating stage, obtaining an original visible light image and an infrared image, and recording the number of each image, corresponding shooting position information and solar radiation intensity information;

shaping and calibrating the original visible light image and the infrared image with reference to identification points of the visible light image according to shooting angles to form a planar image as shot in front;

(2) converting the infrared image obtained in the previous step into a temperature gradient image; adjusting and filtering the image according to the test condition; removing a surface texture effect of the temperature gradient image to obtain a contour map of a surface temperature abnormal region; then comparing with the contour of the original visible light image to identify an original block contour line of a facade from the infrared image; and expressing the remaining other contour line closed regions as defective suspicious blocks;

(3) screening an image having the defective suspicious block; identifying suspicious contour lines corresponding to the obtained defective suspicious block on the infrared image and the original visible light image; and respectively calculating the area and average temperature of the defective suspicious block and surrounding blocks;

(4) after positioning a defective suspicious part of a building according to the recorded numbers of the images, the shooting position information and the defective suspicious region identified on the original visible light image, examining the defective suspicious part again in a cooling time period, and repeating the operation of the above steps (1)-(3);

summarizing each defective suspicious part and the surrounding region; measuring the detected average temperature repeatedly; calculating a temperature difference; and if a significant positive-negative alternating temperature difference is found, judging that the defective suspicious part has a hollowing defect.

Within the required detecting time, when meteorological conditions are poor and the surface temperature is not significantly different, the exterior wall to be detected is irradiated by a laser surface light source for 2-5 minutes; the overall change of temperature rise and the recovery of the irradiating region is tracked and recorded through an infrared camera to observe whether a temperature abnormal region appears in the region; if the abnormal region appears, a region surface with obvious phenomena is selected; image analysis processing is conducted through the steps (1)-(3); and temperature change curves of the abnormal region and the surrounding region are drawn; the heat transfer of the outer surface of the building is calculated by using the laser emitting power of the surface light source; and if a calculation result is consistent with an actual test, the region is judged as a hollowing defect position.

The invention claimed is:

1. A method for detecting hollowing of an exterior wall finish layer, comprising the following steps:
   (1) when an exterior wall to be detected is in solar radiation conditions, conducting an infrared temperature image test of a building facade in a surface heating stage, obtaining an original visible light image and an infrared image, and recording a numerical order of images, corresponding shooting position information and solar radiation intensity information;
   shaping and calibrating the original visible light image and the infrared image with reference to identification points of the original visible light image according to shooting angles to form a planar image;
   (2) converting the infrared image obtained in the previous step into a temperature gradient image; adjusting and filtering the temperature gradient image according to a test condition; removing a surface texture effect from the temperature gradient image to obtain a contour map of a surface temperature abnormal region; then comparing the contour map of a surface temperature abnormal region with a contour of the original visible light image to identify an original block contour line of a facade from the infrared image; and expressing a remaining other contour line closed regions as defective blocks;
   (3) screening an image having the defective blocks; identifying the remaining other contour line on the infrared image and the original visible light image; and respectively calculating an area and average temperature of the defective blocks and surrounding blocks;
   (4) after positioning a defective part of a building according to the numerical order of the images, the shooting position information and the defective part identified on the original visible light image, examining the defective part again in a cooling time period, and repeating the operation of the above steps (1)-(3);
   summarizing each defective part and a surrounding region; measuring the average temperature of the defective blocks and the surrounding blocks repeatedly; calculating a temperature difference between the defective blocks and the surrounding region; and if a significant positive-negative alternating temperature difference is found, judging that the defective part has a hollowing defect.

2. The method for detecting hollowing of an exterior wall finish layer according to claim 1, wherein within a required detecting time, when the surface temperature is not significantly different, the exterior wall to be detected is irradiated by a laser surface light source for 2-5 minutes; an overall change of temperature rise and a recovery of an irradiating region is tracked and recorded through an infrared camera to observe whether a temperature abnormal region appears in the irradiating region; if the temperature abnormal region appears, a region surface with obvious phenomena is selected; image analysis processing is conducted through the steps (1)-(3); and temperature change curves of the abnormal region and the surrounding region are drawn; a heat transfer of an outer surface of the building is calculated by using a laser emitting power of the laser surface light source; and if a calculation result is consistent with the temperature change curves, the irradiating region is judged as a hollowing defect position.

* * * * *